(12) United States Patent
Klipper et al.

(10) Patent No.: US 8,562,922 B2
(45) Date of Patent: *Oct. 22, 2013

(54) PICOLYLAMINE RESINS

(75) Inventors: Reinhold Klipper, Köln (DE); Michael Schelhaas, Köln (DE); Duilio Rossoni, Langenfeld (DE)

(73) Assignee: LANXESS Deutschland GmbH, Cologne, DE (US)

( * ) Notice: Subject to any disclaimer, the term of this patent is extended or adjusted under 35 U.S.C. 154(b) by 239 days.

This patent is subject to a terminal disclaimer.

(21) Appl. No.: 12/919,846

(22) PCT Filed: Feb. 27, 2009

(86) PCT No.: PCT/EP2009/052334
§ 371 (c)(1), (2), (4) Date: Dec. 10, 2010

(87) PCT Pub. No.: WO2009/109520
PCT Pub. Date: Sep. 11, 2009

(65) Prior Publication Data
US 2011/0091365 A1    Apr. 21, 2011

(30) Foreign Application Priority Data

Mar. 3, 2008  (DE) .......... 10 2008 012 223

(51) Int. Cl.
| C08F 8/32 | (2006.01) |
| C08F 212/08 | (2006.01) |
| C01G 13/00 | (2006.01) |
| C01G 49/00 | (2006.01) |
| C01G 3/00 | (2006.01) |
| C01G 9/00 | (2006.01) |

(52) U.S. Cl.
USPC .......... 423/7; 423/100; 423/139; 423/24; 423/89; 423/22; 521/25; 521/183; 521/146; 525/333.6

(58) Field of Classification Search
USPC .......... 423/7, 100, 139, 24, 89, 49, 63, 22; 521/25, 183, 146; 525/333.6
See application file for complete search history.

(56) References Cited

U.S. PATENT DOCUMENTS

| 4,098,867 A | 7/1978 | Grinstead et al. |
| 4,382,124 A | 5/1983 | Meitzner et al. |
| 4,419,245 A | 12/1983 | Barrett et al. |
| 4,427,794 A | 1/1984 | Lange et al. |
| 4,444,961 A | 4/1984 | Timm |
| 4,895,905 A | 1/1990 | Schneider et al. |
| 5,231,115 A | 7/1993 | Harris |
| 6,329,435 B1 | 12/2001 | Klipper et al. |
| 6,649,663 B1 * | 11/2003 | Klipper et al. .......... 521/32 |
| 7,077,964 B2 | 7/2006 | Klipper et al. |
| 2009/0158896 A1* | 6/2009 | Rossoni et al. .......... 75/744 |

FOREIGN PATENT DOCUMENTS

EP    1078690 A2 *  2/2001
WO   WO 2007088010 A1 *  8/2007

OTHER PUBLICATIONS

International Search Report from co-pending Application PCT/EP2009/052334 dated May 27, 2009, 4 pages.
Ullmann's Encyclopedia of Industrial Chemistry, 5th Ed., vol. A, 363-373, VCH Verlagsgesellschaft mbH, Weinheim, 1992.

* cited by examiner

*Primary Examiner* — Michael Bernshteyn
(74) *Attorney, Agent, or Firm* — Nicanor A. Kohncke

(57) ABSTRACT

The present application relates to novel gel-type or macroporous picolylamine resins which are based on at least one monovinylaromatic compound and at least one polyvinylaromatic compound and/or a (meth)acrylic compound and contain tertiary nitrogen atoms in structures of the general formula (I)

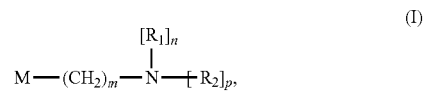

as functional group, where
$R_1$ is an optionally substituted radical from the group consisting of picolyl, methylquinoline and methylpiperidine, $R_2$ is $-CH_2-S-CH_2COOR_3$ or $-CH_2-S-C_1-C_4$-alkyl or $-CH_2-S-CH_2CH(NH_2)COOR_3$ or $-CH_2-S-CH_2-CH(OH)-CH_2(OH)$ or

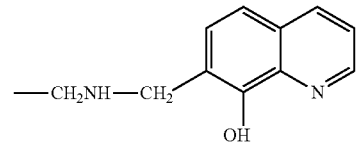

or derivatives thereof or $-C=S(NH_2)$,
$R_3$ is a radical from the group consisting of H, Na and K, m is an integer from 1 to 4, n and p are each, independently of one another, a number in the range from 0.1 to 1.9 and the sum of n and p is 2 and M is the polymer matrix, a process for preparing them and their uses, in particular the use in hydrometallurgy and electroplating.

12 Claims, No Drawings

PICOLYLAMINE RESINS

CROSS REFERENCE TO RELATED PATENT APPLICATIONS

The present patent application claims the right of priority under 35 U.S.C. §119 (a)-(d) and 35 U.S.C. §365 of International Application No. PCT/EP2009/052334, filed 27 Feb. 2009, which is entitled to the right of priority of German Patent Application No. DE 102008012223.8 filed on 3 Mar. 2008.

The present invention relates to novel picolylamine resins containing tertiary nitrogen atoms in structures of the general formula (I)

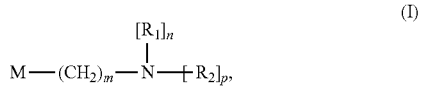

(I)

as functional group, where
$R_1$ is an optionally substituted radical from the group consisting of picolyl, methylquinoline and methylpiperidine, $R_2$ is a radical —$CH_2P(O)(OR_3)_2$ or —$CH_2$—S—$CH_2COOR_3$ or —$CH_2$—S—$C_1$-$C_4$-alkyl or —$CH_2$—S—$CH_2CH(NH_2)$ $COOR_3$ or —$CH_2$—S—$CH_2$—CH(OH)—$CH_2(OH)$ or

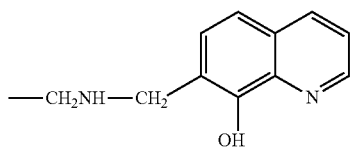

or derivatives thereof or —C=S($NH_2$),
$R_3$ is a radical from the group consisting of H, Na and K, m is an integer from 1 to 4, n and p are each, independently of one another, a number in the range from 0.1 to 1.9 and the sum of n and p is 2 and M is the polymer matrix, a process for preparing them and their uses, in particular the use in hydrometallurgy and electroplating.

Chelating exchangers are nowadays used for many separation problems in industry. Thus, they are used, inter alia, for removing anions from aqueous or organic solutions, for removing anions from condensates, for removing colour particles from aqueous or organic solutions or for removing organic components from aqueous solutions, for example humic acids from surface water.

Furthermore, chelating exchangers can be used for the purification and treatment of water in the chemical industry and electronics industry, in particular for producing high-purity water or else in combination with gel-type and/or macroporous cation exchangers for deionizing aqueous solutions and/or condensates.

Beyond these known applications, there is a desire to open up new fields of application for ion exchangers which are not suitable for the chelating exchangers known at present or in which such chelating exchangers show an insufficient adsorption capacity.

There is therefore a need for novel chelating exchangers based on at least one monovinylaromatic compound and at least one polyvinylaromatic compound as crosslinker, which display improved selectivity for ions to be separated off and also a high mechanical and osmotic stability in column processes compared to the ion exchangers according to the prior art.

U.S. Pat. No. 4,098,867, Table 1, describes a heterodisperse, gel-type chelating resin which bears tertiary nitrogen atoms in a structural element of the formula (II)

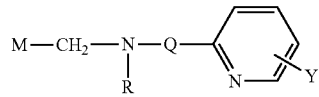

(II)

as functional group, where
M is the resin matrix,
Q if a —$CH_2$— radical,
Y can be H or $C_1$-$C_4$-alkyl and
R is —$CH_2$—COOH.

Chelating resins of this prior art are prepared by halomethylation of a bead polymer which is based on styrene and divinylbenzene and is obtained by suspension polymerization (chloromethylation process), where, on average, from 0.1 to 1.0 halomethyl group per aromatic ring is introduced as reactive group for the addition of the aminomethylpyridine chelating function.

In practice, the use of such a resin according to U.S. Pat. No. 4,098,867 has shown that use in metallurgy, preferably in the winning of metals of value, in particular copper, no longer meets present-day demands.

It was an object of the present invention to provide novel picolylamine resins having the above-described requirement profile for the removal of substances, preferably cations, in particular copper, and polyvalent anions, from liquids, preferably aqueous media or gases, and to provide a process for preparing them. For the purposes of the present invention, substances to be removed additionally include, in particular, metals of value.

This object is achieved by, and the present invention accordingly provides, novel, gel-type or macroporous picolylamine resins which are based on at least one monovinylaromatic compound and at least one polyvinylaromatic compound and/or a (meth)acrylic compound and contain tertiary nitrogen atoms in structures of the general formula (I)

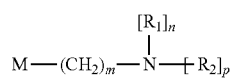

(I)

as functional group, where
$R_1$ is an optionally substituted radical from the group consisting of picolyl, methylquinoline and methylpiperidine, $R_2$ is a radical —$CH_2P(O)(OR_3)_2$ or —$CH_2$—S—$CH_2COOR_3$ or —$CH_2$—S—$C_1$-$C_4$-alkyl or —$CH_2$—S—$CH_2CH(NH_2)$ $COOR_3$ or —$CH_2$—S—$CH_2$—CH(OH)—$CH_2(OH)$ or

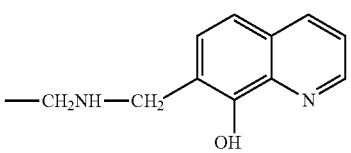

or derivatives thereof or —C=S($NH_2$),
$R_3$ is a radical from the group consisting of H, Na and K, m is an integer from 1 to 4, n and p are each, independently of one another, a number in the range from 0.1 to 1.9 and the sum of n and p is 2 and M is the polymer matrix.

In the interests of clarity, it may be pointed out that any combinations of definitions and parameters mentioned below in general terms or in preferred ranges are encompassed by the scope of the invention.

In a preferred embodiment, n is from 0.5 to 1.5 and p is from 1.5 to 0.5, with the sum of n+p always being 2.

The picolylamine resins of the invention surprisingly display a significantly better absorption capacity for copper than the chelating resins of U.S. Pat. No. 4,098,867.

It may be presumed from studies in the context of the present invention that the halomethylation process described in U.S. Pat. No. 4,098,867 for introducing the functional group for the purpose of preparing the heterodisperse chelating exchanger appears to lead to a limitation of the degree of functionalization. Thus, after-crosslinking appears to occur in the halomethylation according to U.S. Pat. No. 4,098,867 and lead to a loss of halomethyl groups. Owing to the resulting loss of halomethyl groups which can be reacted with aminomethylpyridines, the resulting chelating resins have fewer functional groups available for the winning of metals of value, which considerably restricts the use of the resins in metallurgy. In addition, it has been found that the process according to the prior art is restricted in terms of variability. The preparation of picolylamine resins in a wide range of amounts of picolyl groups and additional chelating groups having a high degree of functionalization, high kinetics and a high capacity is not possible according to U.S. Pat. No. 4,098,867 but is possible by the process of the present invention.

The present application therefore also provides a process for preparing these novel macroporous or gel-type picolylamine resins bearing tertiary nitrogen atoms in structures of the general formula (I)

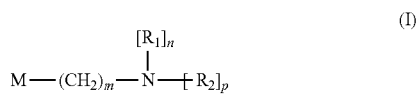

as functional group, where $R_1$, $R_2$, $R_3$, M, m, n and p are as defined above, characterized in that a) monomer droplets of a mixture of a monovinylaromatic compound, a polyvinylaromatic compound and/or a (meth)acrylic compound, an initiator or an initiator combination and optionally a porogen are reacted to form a crosslinked bead polymer, b) the bead polymer obtained is functionalized with primary amino groups, c) the functionalized bead polymer containing amine groups is reacted with halomethyl nitrogen heterocycles to form bead polymers which have basic, anion-exchanging groups and contain methyl nitrogen heterocycles and d) the bead polymer containing methyl nitrogen heterocycles obtained in process step c) is reacted with phosphorus-hydrogen-acidic compounds or sulphur-hydrogen-acidic compounds or else C—H-acidic hydroxyquinone derivatives to form the picolylamine resin of the invention having additional chelating groups, as a result of which this acquires —$CH_2P(O)(OR_3)_2$ or —$CH_2$—S—$CH_2COOR_3$ or —$CH_2$—S—$C_1$-$C_4$-alkyl or —$CH_2$—S—$CH_2CH(NH_2)COOR_3$ or —$CH_2$—S—$CH_2CH(NH_2)COOR_3$ or

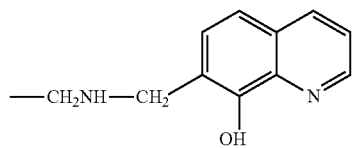

or derivatives thereof or —C=S($NH_2$) as additional chelating group.

According to the present invention, the picolylamine resins can be obtained both in a heterodisperse particle size distribution and in a monodisperse particle size distribution.

The preparation of heterodisperse, crosslinked base polymers according to process step a) can be carried out by known methods of suspension polymerization; see Ullmann's Encyclopedia of Industrial Chemistry, 5th Ed., Vol. A, 363-373, VCH Verlagsgesellschaft mbH, Weinheim, 1992. The water-insoluble monomer/crosslinker mixture is added to an aqueous phase which preferably contains at least one protective colloid to stabilize the monomer/crosslinker droplets in the disperse phase and the bead polymers formed therefrom.

A monodisperse, crosslinked bead polymer is, according to the present invention, obtained in process step a) by carrying out the reaction of process step a) by the jetting process and/or by the seed/feed process. Both processes are known to those skilled in the art, which will be discussed in more detail below. According to the invention, a monodisperse particle size distribution of the picolylamine resins of the invention is preferably sought.

In an alternative embodiment, step d) can be carried out before step c).

In process step a), at least one monovinylaromatic compound and at least one polyvinylaromatic compound and/or a (meth)acrylic compound is used. However, it is also possible to use mixtures of two or more monovinylaromatic compounds and mixtures of two or more polyvinylaromatic compounds.

In process step a) according to the present invention, preference is given to using monoethylenically unsaturated compounds, particularly preferably styrene, vinyltoluene, ethylstyrene, α-methylstyrene, chlorostyrene, chloromethylstyrene, as monovinylaromatic compounds. Particular preference is given to using styrene or mixtures of styrene with the abovementioned monomers.

Preferred polyvinylaromatic compounds which act as crosslinker for process step a) according to the present invention are multifunctional ethylenically unsaturated compounds, particularly preferably butadiene, isoprene, divinylbenzene, divinyltoluene, trivinylbenzene, divinylnaphthalene, trivinylnaphthalene, divinylcyclohexane, trivinylcyclohexane, triallyl cyanurate, triallylamine, 1,7-octadiene, 1,5-hexadiene, cyclopentadiene, norbornadiene, diethylene glycol divinyl ether, triethylene glycol divinyl ether, tetraethylene glycol divinyl ether, butanediol divinyl ether, ethylene glycol divinyl ether, cyclohexanedimethanol divinyl ether, hexanediol divinyl ether, trimethylolpropane trivinyl ether, ethylene glycol dimethacrylate, trimethylolpropane trimethacrylate or allyl methacrylate. Divinylbenzene is particularly preferred in many cases. For most applications, commercial divinylbenzene grades which contain ethylvinylbenzene in addition to the isomers of divinylbenzene are satisfactory.

The polyvinylaromatic compounds are preferably used in amounts of 1-20% by weight, particularly preferably 2-12% by weight, very particularly preferably 4-10% by weight, based on the monomer or the mixture thereof with further monomers. The type of polyvinylaromatic compounds (crosslinkers) is selected with a view to the later use of the bead polymer.

For the purposes of the present invention, (meth)acrylic compounds are monoethylenically unsaturated compounds, preferably alkyl(meth)acrylates, (meth)acrylonitriles, (meth) acrylic acid, particularly preferably methyl acrylate, methyl methacrylate and acrylonitrile. For the purposes of the present invention, very particular preference is given to using acrylonitrile or methyl acrylate.

The (meth)acrylic compounds are preferably used in amounts of from 1 to 30% by weight, particularly preferably from 1 to 10% by weight, based on the sum of all monomers. According to the invention, (meth)acrylic acid refers both to acrylic acid and to methacrylic acid. This also applies to the further (meth)acrylic compounds mentioned in the present invention.

The base polymers on which the picolylamine resins of the invention are based are in each case present in a monodisperse bead size distribution after process step a).

In a preferred embodiment of the present invention, microencapsulated monomer droplets are used in process step a); the materials known for use as complex coacervates, in particular polyesters, natural or synthetic polyamides, polyurethanes, polyureas, are possible for the microencapsulation of the monomer droplets.

As natural polyamide, preference is given to using gelatin. This is employed, in particular, as coacervate and complex coacervate. For the purposes of the present invention, gelatin-containing complex coacervates are, in particular, combinations of gelatin with synthetic polyelectrolytes. Suitable synthetic polyelectrolytes are copolymers having built-in units, preferably of maleic acid, acrylic acid, methacrylic acid, acrylamide and methacrylamide. Particular preference is given to using acrylic acid and acrylamide. Gelatin-containing capsules can be hardened by means of customary hardeners, preferably formaldehyde or glutaric dialdehyde. The encapsulation of monomer droplets by means of gelatin, gelatin-containing coacervates or gelatin-containing complex coacervates is comprehensively described in EP-A 0 046 535. The methods of encapsulation by means of synthetic polymers are known. A well-suited method is, for example, phase interface condensation, in which a reactive component, preferably an isocyanate or an acid chloride, dissolved in the monomer droplet is reacted with a second reactive component, preferably an amine, dissolved in the aqueous phase.

The optionally microencapsulated monomer droplets contain an initiator or mixtures of initiators to trigger the polymerization. Suitable initiators which are preferred for the process of the invention are peroxy compounds, particularly preferably dibenzoyl peroxide, dilauroyl peroxide, bis(p-chlorobenzoyl) peroxide, dicyclohexylperoxy dicarbonate, tert-butyl peroctoate, tert-butylperoxy 2-ethylhexanoate, 2,5-bis(2-ethylhexanoylperoxy)-2,5-dimethylhexane or tert-amylperoxy-2-ethylhexane, and also azo compounds, particularly preferably 2,2'-azobis(isobutyronitrile) or 2,2'-azobis(2-methylisobutyronitrile).

The initiators are preferably employed in amounts of from 0.05 to 2.5% by weight, particularly preferably from 0.1 to 1.5% by weight, based on the monomer mixture.

In contrast to the heterodisperse particle size distribution known from the prior art, the term monodisperse in the present application refers to bead polymers or picolylamine resins having an additional chelating function in which at least 90% by volume or % by mass of the particles have a diameter which is in the range of the mode of the diameter ±10% of the mode of the diameter.

For example, in the case of a bead polymer having a mode of the diameter of 0.5 mm, at least 90% by volume or % by mass is in a size range from 0.45 mm to 0.55 mm; in the case of a material having a mode of the diameter of 0.7 mm, at least 90% by volume or % by mass is in a size range from 0.77 mm to 0.63 mm.

A monodisperse, crosslinked, vinylaromatic base polymer as per process step a) can be prepared by the processes known from the literature. For example, said processes are described in U.S. Pat. No. 4,444,961, EP-A 0 046 535, U.S. Pat. No. 4,419,245 or WO 93/12167, whose contents are fully incorporated into the present application in respect of process step a). If process step a) is carried out by the jetting process or the seed/feed process, monodisperse bead polymers and the monodisperse picolylamine resins to be prepared therefrom are obtained according to the invention.

The terms microporous or gel-type or macroporous have already been comprehensively described in the specialist literature. Preferred bead polymers for the purposes of the present invention, prepared by process step a), have a macroporous structure.

The formation of macroporous bead polymers can be carried out, for example, by adding inert materials (porogens) to the monomer mixture in the polymerization. Suitable materials of this type are, in particular, organic substances which dissolve in the monomer but do not readily dissolve or swell the polymer (precipitants for polymers), preferably aliphatic hydrocarbons (Farbenfabriken Bayer DBP 1045102, 1957; DBP 1113570, 1957).

In U.S. Pat. No. 4,382,124, alcohols having from 4 to 10 carbon atoms, for example, are used as porogens for preparing monodisperse, macroporous bead polymers based on styrene/divinylbenzene. Furthermore, this document gives an overview of the methods of preparing macroporous bead polymers. According to the invention, organic solvents which do not readily dissolve or swell the polymer formed are preferred as porogens. Preference is given to hexane, octane, isooctane, isododecane, methyl ethyl ketone, butanol or octanol and isomers thereof.

The optionally microencapsulated monomer droplet can also optionally contain up to 30% by weight (based on the monomer) of crosslinked or uncrosslinked polymer. Preferred polymers are derived from the abovementioned monomers, particularly preferably from styrene.

The average particle size of the optionally encapsulated monomer droplets is 10-1000 μm, preferably 100-1000 μm. In the preparation of the monodisperse bead polymers in process step a), the aqueous phase can optionally contain a dissolved polymerization inhibitor. Possible inhibitors for the purposes of the present invention are both inorganic and organic materials. Preferred inorganic inhibitors are nitrogen compounds such as hydroxylamine, hydrazine, sodium nitrite or potassium nitrite, salts of phosphorous acid, e.g. sodium hydrogenphosphite, and also sulphur-containing compounds such as sodium dithionite, sodium thiosulphate, sodium sulphite, sodium bisulphite, sodium thiocyanate or ammonium thiocyanate. Preferred organic inhibitors are phenolic compounds such as hydroquinone, hydroquinone monomethyl ether, resorcinol, catechol, tert-butyl catechol, pyrogallol or condensation products of phenols with aldehydes. Further preferred organic inhibitors are nitrogen-containing compounds such as hydroxylamine derivatives, preferably N,N-diethylhydroxylamine or N-isopropylhydroxylamine, and also sulphonated or carboxylated N-alkylhydroxylamine or N,N-dialkylhydroxylamine derivatives, hydrazine derivatives, preferably N,N-hydrazinodiacetic acid, nitroso compounds, preferably N-nitrosophenylhydroxylamine, N-nitrosophenylhydroxylamine ammonium salt or N-nitrosophenylhydroxylamine aluminium salt. The concentration of the inhibitor is 5-1000 ppm (based on the aqueous phase), preferably 10-500 ppm, particularly preferably 10-250 ppm.

The polymerization of the optionally microencapsulated monomer droplets to form the spherical bead polymer may, as has been mentioned above, optionally be carried out in the presence of one or more protective colloids in the aqueous phase. Suitable protective colloids are natural or synthetic water-soluble polymers, preferably gelatin, starch, polyvinyl alcohol, polyvinylpyrrolidone, polyacrylic acid, polymethacrylic acid or copolymers of (meth)acrylic acid and (meth)acrylic esters. Cellulose derivatives, in particular cellulose esters and cellulose ethers, e.g. carboxymethylcellulose, methylhydroxyethylcellulose, methylhydroxypropylcellulose and hydroxyethylcellulose, are very well suited. Particular preference is given to gelatin. The amount of protective colloids used is generally from 0.05 to 1% by weight based on the aqueous phase, preferably from 0.05 to 0.5% by weight.

The polymerization to form the bead polymer in process step a) can optionally also be carried out in the presence of a buffer system. Preference is given to buffer systems which adjust the pH of the aqueous phase at the beginning of the polymerization to a value in the range from 14 to 6, preferably from 12 to 8. Under these conditions, protective colloids having carboxylic acid groups are entirely or partly present as salts. This exerts a favourable influence on the action of the protective colloids. Particularly preferred buffer systems contain phosphate or borate salts. For the purposes of the invention, the terms phosphate and borate also encompass the condensation products of the ortho forms of corresponding acids and salts. The concentration of the phosphate or borate in the aqueous phase is 0.5-500 mmol/l, preferably 2.5-100 mmol/l.

The stirring speed in the polymerization is less critical and, in contrast to the conventional bead polymerization, has no influence on the particle size. Low stirring speeds which are sufficient to keep the suspended monomer droplets in suspension and aid the removal of the heat of polymerization are employed. Various stirrer types can be used for this task. Grid stirrers having an axial action are particularly suitable.

The volume ratio of encapsulated monomer droplets to aqueous phase is preferably from 1:0.75 to 1:20, particularly preferably from 1:1 to 1:6.

The polymerization temperature in process step a) depends on the decomposition temperature of the initiator used. It is generally in the range from 50 to 180° C., preferably from 55 to 130° C. The polymerization takes from 0.5 hour to a number of hours. A temperature program in which the polymerization is commenced at low temperature, preferably about 60° C., and the reaction temperature is increased as the polymerization conversion progresses is preferably employed. In this way, the requirement for a reliable course of the reaction and a high polymerization conversion, for example, can be met very well. After the polymerization, the polymer is isolated by customary methods, preferably by filtration or decantation, and optionally washed.

The crosslinked bead polymer based on monovinylaromatics which is prepared in process step a) is, in contrast to U.S. Pat. No. 4,098,867 (chloromethylation process) functionalized with primary amino groups by the phthalimide process. For this purpose, the amidomethylation reagent is firstly prepared in process step b). For this purpose, phthalimide or a phthalimide derivative is preferably dissolved in a solvent and admixed with formalin. A bis(phthalimido) ether is subsequently formed therefrom with elimination of water. The bis(phthalimido) ether can, in an alternative preferred embodiment, be converted into the phthalimido ester. Preferred phthalimide derivatives for the purposes of the present invention are phthalimide itself or substituted phthalimides, preferably methylphthalimide.

As solvents in process step b), preference is given to using inert solvents which are suitable for swelling the polymer. According to the invention, particular preference is given to using chlorinated hydrocarbons, very particularly preferably dichloroethane or methylene chloride, for this purpose.

In process step b), the bead polymer is condensed with phthalimide derivatives. Preference is given to using oleum, sulphuric acid or sulphur trioxide as catalyst.

The phthalimide process to be used according to the invention in process step b) can, according to U.S. Pat. No. 4,952,608, be carried out as follows:

Phthalimide and 20-40% strength aqueous formaldehyde solution (molar ratio of phthalimide:formaldehyde about 1:1-1.5) are introduced into the swelling agent (amount of swelling agent: about 3-6 parts by weight per part by weight of phthalimide). The suspension obtained in this way is heated while stirring to temperatures of from 60 to 80° C. and brought to a pH of 5-6 by addition of 20-50% strength aqueous sodium hydroxide solution and, if necessary, kept in this range during the reaction by addition of further sodium hydroxide solution. The pH is determined by means of an electrode dipping into the agitated suspension. The end of the reaction can clearly be seen from the suspension having been converted into a turbid solution. The stirrer is switched off so that the phases can separate. The lower, organic phase containing the N-hydroxymethylphthalimide is separated off and dried.

The solution of N-hydroxymethylphthalimide in the swelling agent which is obtained in this way is either used directly for the amidomethylation of the crosslinked, water-insoluble organic polymer containing aromatic rings or else the N-hydroxymethylphthalimide is firstly converted into bis(phthalimidomethyl)ether or into an ester and the ether or the ester is used for the amidoalkylation reaction. The amidomethylation of the organic polymers by means of the solution of N-hydroxymethylphthalimide, bis(phthalimidomethyl)ether or the esters of N-hydroxymethylphthalimide in the swelling agents is carried out in a manner known per se, e.g. by the procedures described in DE-B 22 11 134, 21 61 628, 25 19 244 and 24 18 976.

The amidomethylation of the organic polymers may be illustrated by the amidomethylation using bis(phthalimidomethyl)ether (A) and by the amidomethylation using the acetic ester of N-hydroxymethylphthalimide (B):

A. The solution of N-hydroxymethylphthalimide in the swelling agent which is obtained in the first process step is admixed with catalytic amounts of sulphuric acid (0.07 mol of $H_2SO_4$ per mole of N-hydroxymethylphthalimide), heated while stirring to reflux temperature and stirred at this temperature until ether formation is complete (the course of ether formation is followed chromatographically; the yield of ether is approximately quantitative). Water is removed from the system by distillation during this reaction. The suspension present after ether formation is complete is cooled to about room temperature and admixed with the Friedel-Crafts catalyst, e.g. iron(III) chloride, tin tetrachloride or preferably sulphur trioxide, intended for the amidomethylation. The polymer to be amidomethylated is introduced into this mixture (amount of polymer:ratio of mole of aromatic rings present in the polymer:bis(phthalimidomethyl)ether=1:0.5-4, preferably 1:0.75-2.5). The reaction mixture is heated while stirring to temperatures of from 65 to 80° C. and subsequently stirred at this temperature for 18 hours. After cooling to room temperature, the phthalimidomethylated polymer is separated off from the liquid phase (the swelling agent), taken up in deionized water and freed of adhering swelling agent by azeotropic distillation. The phthalimidomethylated polymer is finally hydrolyzed in a known manner, e.g. by alkaline or acid hydrolysis or by reaction with hydrazine and subsequent acid hydrolysis, optionally in the presence of an organic solvent; this organic solvent can, for example, be the swelling agent used for the amidomethylation.

B. In the amidomethylation using esters of N-hydroxymethylphthalimide, e.g. the acetic ester, the dried solution of N-hydroxymethylphthalimide in the swelling agent used which is obtained in the first process step is admixed with the amount of acetic anhydride required for the esterification and heated while stirring at reflux temperature until ester formation is complete (the course of ester formation is monitored chromatographically; the yield of ester is virtually quantitative). After the esterification is complete, the solution is cooled to from 20 to 50° C. and the organic polymer to be amidomethylated is introduced while stirring (amount of polymer:ratio of aromatic rings in the polymer:mole of ester=1:0.5-4, preferably 1:1-2.5). The polymer is swelled in the ester solution for 0.5-2 hours at 50-70° C. The suspension is subsequently heated to reflux temperature and admixed with the intended Friedel-Crafts catalyst, preferably sulphuric acid, and subsequently stirred at reflux temperature for 20 hours.

The pH range for the formation of N-methylolphthalimide is 4-10, preferably 5-6.5; the formation of N-methylolphthalimide can be carried out under atmospheric pressure or superatmospheric pressure.

The work-up of the reaction mixture and the hydrolysis of the phthalimidomethylated polymer is carried out as described under A.

The elimination of the phthalic acid radical and thus the setting-free of the aminomethyl group is carried out in process step c) by treating the phthalimidomethylated crosslinked bead polymer from process step b) with aqueous or alcoholic solutions of an alkali metal hydroxide, preferably sodium hydroxide or potassium hydroxide, at temperatures in the range from 100 to 250° C., preferably 120-190° C. The concentration of the sodium hydroxide solution is preferably in the range from 10 to 50% by weight, particularly preferably in the range from 20 to 40% by weight. This process makes it possible to prepare crosslinked bead polymers which contain aminoalkyl groups and have a substitution of the aromatic rings of greater than 1.

The aminomethylated bead polymer formed is finally washed free of alkali with deionized water (DI water).

In process step c), the picolylamine resins of the invention are prepared by reacting the monodisperse, crosslinked, vinylaromatic bead polymers containing primary aminoalkyl groups from process step b) in aqueous suspension with optionally substituted chloromethyl nitrogen heterocycles, preferably chloromethylpyridine or its hydrochloride, 2-chloromethylquinoline or 2-chloromethylpiperidine.

Chloromethylpyridine or its hydrochloride can be used as 2-chloromethylpyridine, 3-chloromethylpyridine or 4-chloromethylpyridine.

As preferred reagent in process step c), use is made of 2-chloromethylpyridine hydrochloride, preferably in aqueous solution.

In a preferred embodiment, the reaction in process step c) is carried out with addition of alkali metal hydroxide solution, particularly preferably potassium hydroxide solution or sodium hydroxide solution, very particularly preferably sodium hydroxide solution. Addition of alkali metal hydroxide solution in the reaction of the crosslinked, vinylaromatic base polymer containing aminomethyl groups from process step c) in aqueous suspension with halomethyl nitrogen heterocycles, preferably picolyl chloride or its hydrochloride, keeps the pH during the reaction in the range 4-11. The pH is preferably kept in the range 6-8.

In process step d), the second chelating group, viz. the —CH$_2$P(O)(OR$_3$)$_2$ or —CH$_2$—S—CH$_2$COOR$_3$ or —CH$_2$—S—C$_1$-C$_4$-alkyl or —CH$_2$—S—CH$_2$CH(NH$_2$)COOR$_3$ or —CH$_2$—S—CH$_2$—CH(OH)—CH$_2$(OH) or

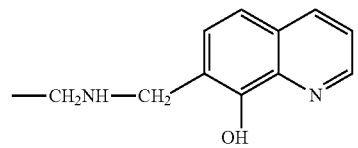

or its derivatives or —C=S(NH$_2$) group, is introduced.

For this purpose, the bead polymer from process step c) is introduced at room temperature into aqueous sulphuric acid.

The pH of the suspension is less than 3, preferably less than 2.

Phosphorus-hydrogen-acid compounds, preferably phosphorus(III) compounds, particularly preferably phosphorous acid or dimethyl phosphite, or else sulphur-hydrogen-acid compounds, preferably thiohydrogen compounds, particularly preferably thioglycolic acid, alkyl mercaptans, particularly preferably butanethiol, L-cystein or 1,2-dihydroxypropylmercaptohydrogen, or else C—H-acidic hydroxyquinone derivatives are introduced for this purpose. Finally, aqueous formalin solution is introduced at temperatures above 50° C., particularly preferably at from 80 to 95° C.

The mixture is subsequently stirred at reflux temperature for a number of hours.

After cooling the suspension, the picolylamine resin of the invention is separated off, preferably by means of a sieve, and washed with water. To remove relatively small particles of solid and liquid impurities, the picolylamine resin of the invention can be classified using water in a column.

If a group containing an acid function has been introduced as second chelating group, the picolylamine resin of the invention can be converted into the salt form by treatment with aqueous alkalis such as sodium hydroxide or potassium hydroxide.

The picolylamine resins prepared according to the invention are suitable for the adsorption of metals, in particular heavy metals and noble metals, and compounds thereof from aqueous solutions, organic liquids or gases, preferably from acidic, aqueous solutions. The picolylamine resins prepared according to the invention are particularly suitable for the removal of heavy metals or noble metals from aqueous solutions, in particular from aqueous solutions of alkaline earth metals or alkali metals, from brines for alkali metal chloride electrolysis, from aqueous hydrochloric acids, from wastewater or flue scrubbing liquors, but also from liquid or gaseous hydrocarbons, carboxylic acids such as adipic acid, glutaric acid or succinic acid, natural gas, natural gas condensates, petroleum or halogenated hydrocarbons such as chlorinated or fluorinated hydrocarbons or chlorofluorocarbons. In addition, the picolylamine resins of the invention are suitable for the removal of alkaline earth metals from brines as are customarily used in alkali metal chloride electrolysis. The picolylamine resins of the invention are also suitable for the removal of heavy metals, in particular iron, cadmium or lead, from materials which are reacted in an electrolytic treatment, for example a dimerization of acrylonitrile to adiponitrile.

The picolylamine resins of the invention are very particularly suitable for the removal of mercury, iron, cobalt, nickel, copper, zinc, lead, cadmium, manganese, uranium, vanadium, elements of the platinum group and also gold or silver from the abovementioned solutions, liquids or gases.

In particular, the picolylamine resins of the invention are suitable for the removal of rhodium or elements of the platinum group and also gold, silver or rhodium or catalyst residues containing noble metal from organic solutions or solvents.

However, the picolylamine resins of the invention are very particularly suitable for the isolation or winning of copper from copper solutions which additionally likewise contain divalent foreign metals present in aqueous solution, most particularly preferably for the adsorption of copper from copper/iron sulphate solutions or from copper/nickel sulphate solutions.

Apart from the use in metallurgy for the winning of metals of value, the picolylamine resins of the invention having a tertiary nitrogen atom in the functional group of the general formula (I) are highly suitable for various applications in the chemical industry, the electronics industry, the waste disposal/recycling industry or electroplating or surface technology.

Methods of Examination

Determination of the Amount of Basic Aminomethyl Groups in the Aminomethylated, Crosslinked Polystyrene Bead Polymer:

100 ml of the aminomethylated bead polymer are shaken down in a tamping volumeter and subsequently rinsed into a glass column by means of DI water. 1000 ml of 2% strength by weight sodium hydroxide solution are filtered through the polymer over a period of 1 hour and 40 minutes. DI water is subsequently filtered through until 100 ml of eluate admixed with phenolphthalein have a consumption of 0.1N (0.1 normal) hydrochloric acid of not more than 0.05 ml.

50 ml of this resin are admixed with 50 ml of DI water and 100 ml of 1N hydrochloric acid in a glass beaker. The suspension is stirred for 30 minutes and subsequently introduced into a glass column. The liquid is drained off. A further 100 ml of 1N hydrochloric acid are filtered through the resin over a period of 20 minutes. 200 ml of methanol are subsequently filtered through. All eluates are collected and combined and titrated against methyl orange with 1N sodium hydroxide.

The amount of aminomethyl groups in 1 liter of aminomethylated resin is calculated by the following formula: $(200-V)\cdot 20$=mol of aminomethyl groups per liter of resin.

DI water or deionized water is, for the purpose of the present invention, characterized by having a conductivity of from 0.1 to 10 μS, with the content of dissolved or undissolved metal ions being not greater than 1 ppm, preferably not greater than 0.5 ppm, for Fe, Co, Ni, Mo, Cr, Cu as individual components and not greater than 10 ppm, preferably not greater than 1 ppm, for the sum of the metals mentioned.

The present invention has been described with reference to specific details of particular embodiments thereof. It is not intended that such details be regarded as limitations upon the scope of the invention except insofar as and to the extent that they are included in the accompanying claims.

As used in this specification and the appended claims, the singular forms "a," "an," and "the" include plural referents unless the content clearly dictates otherwise.

EXAMPLE 1

1a) Preparation of a Monodisperse, Macroporous Bead Polymer Based on Styrene, Divinylbenzene and Ethyl Styrene 3000 g of DI water were placed in a 10 l glass reactor and a solution of 10 g of gelatin, 16 g of disodium hydrogenphosphate dodecahydrate and 0.73 g of resorcinol in 320 g of DI water was added and the mixture was mixed. The mixture was heated to 25° C. While stirring, a mixture of 3200 g of microencapsulated monomer droplets having a narrow particle size distribution and composed of 3.6% by weight of divinylbenzene and 0.9% by weight of ethylstyrene (used as commercial isomer mixture of divinylbenzene and ethylstyrene containing 80% of divinylbenzene), 0.5% by weight of dibenzoyl peroxide, 56.2% by weight of styrene and 38.8% by weight of isododecane (industrial isomer mixture having a high proportion of pentamethylheptane) was subsequently added, where the microcapsule consisted of a formaldehyde-cured complex coacervate of gelatin and a copolymer of acrylamide and acrylic acid, and added to 3200 g of aqueous phase having a pH of 12. The average particle size of the monomer droplets was 300 μm.

The mixture was fully polymerized while stirring by increasing the temperature according to a temperature program commencing at 25° C. and ending at 95° C. The mixture was cooled, washed on a 32 μm sieve and subsequently dried at 80° C. under reduced pressure. This gave 1893 g of a spherical bead polymer having an average particle size of 280 μm, a narrow particle size distribution and a smooth surface.

The bead polymer had a chalky white appearance and had a bulk density of about 370 g/l.

1b) Preparation of an Amidomethylated Bead Polymer 1455 ml of dichloroethane, 540.7 g of phthalimide and 373.7 g of 30.1% strength by weight formalin were placed in a reaction vessel at room temperature. The pH of the suspension was set to 5.5-6 by means of sodium hydroxide solution. The water was subsequently removed by distillation. 36.9 g of sulphuric acid were then added. The water formed was removed by distillation. The mixture was cooled. At 30° C., 144.9 g of 65% strength oleum and subsequently 371.4 g of monodisperse bead polymer prepared according to process step 1a) were introduced. The suspension was heated to 70° C. and stirred at this temperature for a further 6.5 hours. The reaction liquor was taken off, DI water was introduced and residual amounts of dichloroethane were removed by distillation.

Yield of amidomethylated bead polymer: 1860 ml
Elemental analytical composition:
Carbon: 76.8% by weight;
Hydrogen: 5.2% by weight;
Nitrogen: 5.0% by weight;
Balance: oxygen.

1b') Preparation of an Aminomethylated Bead Polymer 512 ml of 50% strength by weight sodium hydroxide solution and 1638 ml of DI water were introduced at room temperature into 1800 ml of amidomethylated bead polymer from 1b). The suspension was heated to 180° C. over a period of 2 hours and stirred at this temperature for 8 hours. The bead polymer obtained was washed with DI water.

Yield of aminomethylated bead polymer: 1440 ml
Elemental analytical composition:
Nitrogen: 9.3% by weight;
Carbon: 78.5% by weight;
Hydrogen: 8.5% by weight.

Determination of the amount of basic groups: 2.16 mol/liter of resin

1c) Preparation of a Resin Having Monopicolylamine Groups

Apparatus:

6 liter reactor, stirrer, pH electrode, sodium hydroxide metering, reflux condenser, heating bath 1000 ml of DI water and 1500 ml of resin from step 1c) were placed in a reaction vessel.

The suspension was heated to 90° C. At this temperature, 639.6 gram of picolyl chloride hydrochloride solution (519.47 g of 98.5% pure picolyl chloride hydrochloride+ 120.13 g of water) was introduced over a period of 4 hours.

The pH was maintained at pH 7.0 by introduction of aqueous 50% strength by weight sodium hydroxide solution.

The mixture was subsequently heated to 95° C. and stirred at pH 7.0 for a further 6 hours.

Consumption of 50% strength by weight sodium hydroxide solution: 553 g

The mixture was cooled. The resin was poured onto a sieve and washed with water.

Yield: 1900 ml

The mass of resin was introduced into a column and treated with 1000 ml of 4% strength by weight sodium hydroxide solution.

Yield: 1900 ml
Elemental analytical composition:
C, 80.0% by weight
N, 11.5% by weight
H, 7.4% by weight
O, 2.6% by weight
HCl number: 2.25 mol/l
Volume of form as supplied: 100 ml
Volume of chloride form: 138 ml
Dry weight: 50 ml, 17.06 g 1d) Preparation of a Bifunctional, Monodisperse Resin Having Picolylamine Groups and Methylphosphonic Acid Groups Apparatus:

3 liter reactor, stirrer, pH electrode, sodium hydroxide metering, reflux condenser, heating bath 260 ml of DI water and 500 ml of resin from Example 1c) were placed in a reaction vessel at room temperature. 149 gram of dimethyl phosphite were introduced at 25° C. while stirring over a period of 15 minutes. The mixture was stirred for a further 30 minutes. The suspension was heated to 60° C. 882 gram of sulphuric acid monohydrate were introduced over a period of 4 hours. The mixture was heated to reflux temperature and 259 gram of 30% strength by weight formalin solution were introduced at this temperature over a period of 1 hour.

The mixture was stirred at reflux temperature for a further 6 hours. After cooling, the resin was filtered off on a sieve and washed with DI water.

The resin was rinsed into a glass column by means of DI water and classified.

Yield: 725 ml

The resin was transferred to a glass column. 2000 ml of 4% strength by weight aqueous sodium hydroxide solution were introduced into the column from above over a period of 2 hours. The resin was subsequently washed with 2000 ml of DI water.

Yield: 815 ml
Amount of methylphosphonic acid groups: 1.54 mol/l
Volume of form as supplied: 100 ml
Volume of 1st H form: 81 ml
Volume of Na form: 105 ml
Volume of 2nd H form: 81 ml Further examples of picolylamine resins according to the invention having the structural unit of the formula (I)

$$M-(CH_2)_m-N(R_1)-R_2 \quad (I)$$

| Ex. | m | $R_2$ | $R_1$ |
|---|---|---|---|
| 2 | 2 | —$CH_2P(O)(OR_3)_2$ | —$CH_2$-(2-pyridyl) |
| 3 | 3 | —$CH_2P(O)(OR_3)_2$ | —$CH_2$-(2-pyridyl) |
| 4 | 4 | —$CH_2P(O)(OR_3)_2$ | —$CH_2$-(2-pyridyl) |
| 5 | 1 | —$CH_2$—S—$CH_2COOR_3$ | —$CH_2$-(2-pyridyl) |
| 6 | 2 | —$CH_2$—S—$CH_2COOR_3$ | —$CH_2$-(2-pyridyl) |
| 7 | 3 | —$CH_2$—S—$CH_2COOR_3$ | —$CH_2$-(2-pyridyl) |

-continued $$M-(CH_2)_m-\underset{\underset{R_2}{|}}{\overset{\overset{R_1}{|}}{N}}$$ (I)

| Ex. | m | $R_2$ | $R_1$ |
|---|---|---|---|
| 8 | 4 | —$CH_2$—S—$CH_2COOR_3$ | —$CH_2$-(2-pyridyl) |
| 9 | 1 | —$CH_2$—S—$C_1$-$C_4$-alkyl | —$CH_2$-(2-pyridyl) |
| 10 | 2 | —$CH_2$—S—$C_1$-$C_4$-alkyl | —$CH_2$-(2-pyridyl) |
| 11 | 3 | —$CH_2$—S—$C_1$-$C_4$-alkyl | —$CH_2$-(2-pyridyl) |
| 12 | 4 | —$CH_2$—S—$C_1$-$C_4$-alkyl | —$CH_2$-(2-pyridyl) |
| 13 | 1 | —$CH_2$—S—$H_2CH(NH_2)COOR_3$ | —$CH_2$-(2-pyridyl) |
| 14 | 2 | —$CH_2$—S—$H_2CH(NH_2)COOR_3$ | —$CH_2$-(2-pyridyl) |
| 15 | 3 | —$CH_2$—S—$H_2CH(NH_2)COOR_3$ | —$CH_2$-(2-pyridyl) |
| 16 | 4 | —$CH_2$—S—$H_2CH(NH_2)COOR_3$ | —$CH_2$-(2-pyridyl) |
| 17 | 1 | —$CH_2$—S—$CH_2$—CH(OH)—$CH_2$(OH) | —$CH_2$-(2-pyridyl) |
| 18 | 2 | —$CH_2$—S—$CH_2$—CH(OH)—$CH_2$(OH) | —$CH_2$-(2-pyridyl) |
| 19 | 3 | —$CH_2$—S—$CH_2$—CH(OH)—$CH_2$(OH) | —$CH_2$-(2-pyridyl) |
| 20 | 4 | —$CH_2$—S—$CH_2$—CH(OH)—$CH_2$(OH) | —$CH_2$-(2-pyridyl) |

-continued
$$M-(CH_2)_m-\underset{R_2}{\underset{|}{N}}-R_1 \quad (I)$$
| Ex. | m | R₂ | R₁ |
|---|---|---|---|
| 21 | 1 | 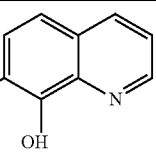 | 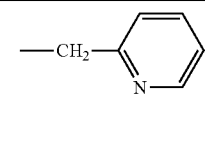 |
| 22 | 2 | 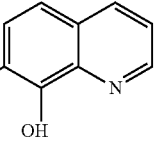 | 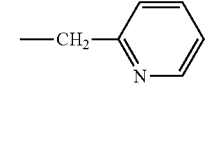 |
| 23 | 3 | 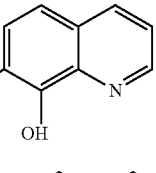 | 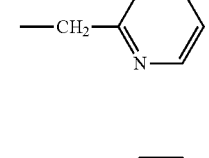 |
| 24 | 4 | 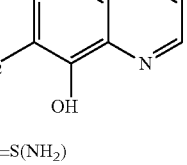 | 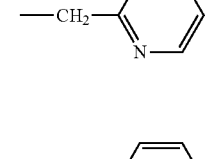 |
| 25 | 1 | —C=S(NH₂) | 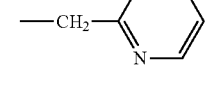 |
| 26 | 2 | —C=S(NH₂) | 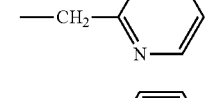 |
| 27 | 3 | —C=S(NH₂) | 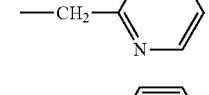 |
| 28 | 4 | —C=S(NH₂) | 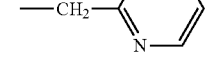 |
| 29 | 1 | —CH₂P(O)(OR₃)₂ | 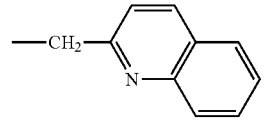 |
| 30 | 1 | —C=S(NH₂) | 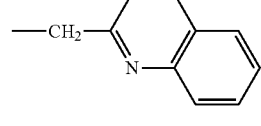 |
| 31 | 1 | 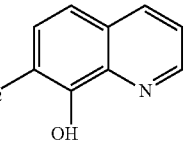 | 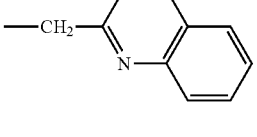 |

-continued $$M-(CH_2)_m-\underset{\underset{R_2}{|}}{\overset{\overset{R_1}{|}}{N}} \qquad (I)$$

| Ex. | m | R$_2$ | R$_1$ |
|---|---|---|---|
| 32 | 1 | —CH$_2$—S—CH$_2$—CH(OH)—CH$_2$(OH) | 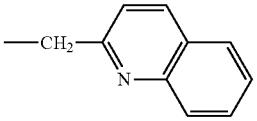 —CH$_2$-quinolin-2-yl |
| 33 | 1 | —CH$_2$—S—C$_1$-C$_4$-alkyl | 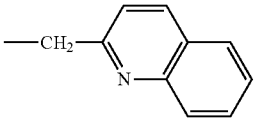 —CH$_2$-quinolin-2-yl |
| 34 | 1 | —CH$_2$—S—CH$_2$COOR$_3$ | 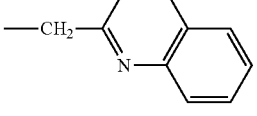 —CH$_2$-quinolin-2-yl |
| 35 | 2 | —CH$_2$—S—CH$_2$COOR$_3$ | 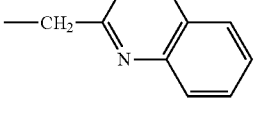 —CH$_2$-quinolin-2-yl |
| 36 | 2 | —CH$_2$P(O)(OR$_3$)$_2$ | 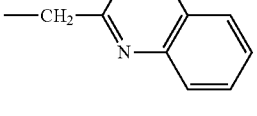 —CH$_2$-quinolin-2-yl |
| 37 | 2 | —C=S(NH$_2$) | 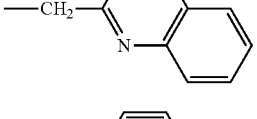 —CH$_2$-quinolin-2-yl |
| 38 | 3 | —CH$_2$P(O)(OR$_3$)$_2$ | 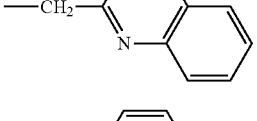 —CH$_2$-quinolin-2-yl |
| 39 | 4 | —CH$_2$P(O)(OR$_3$)$_2$ | 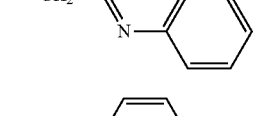 —CH$_2$-quinolin-2-yl |
| 40 | 3 | —CH$_2$—S—CH$_2$COOR$_3$ | 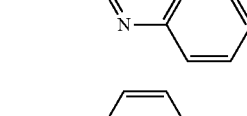 —CH$_2$-quinolin-2-yl |
| 41 | 4 | —CH$_2$—S—CH$_2$COOR$_3$ | 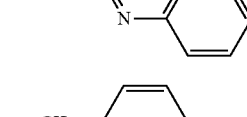 —CH$_2$-quinolin-2-yl |
| 42 | 3 | —C=S(NH$_2$) | 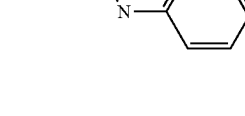 —CH$_2$-quinolin-2-yl |

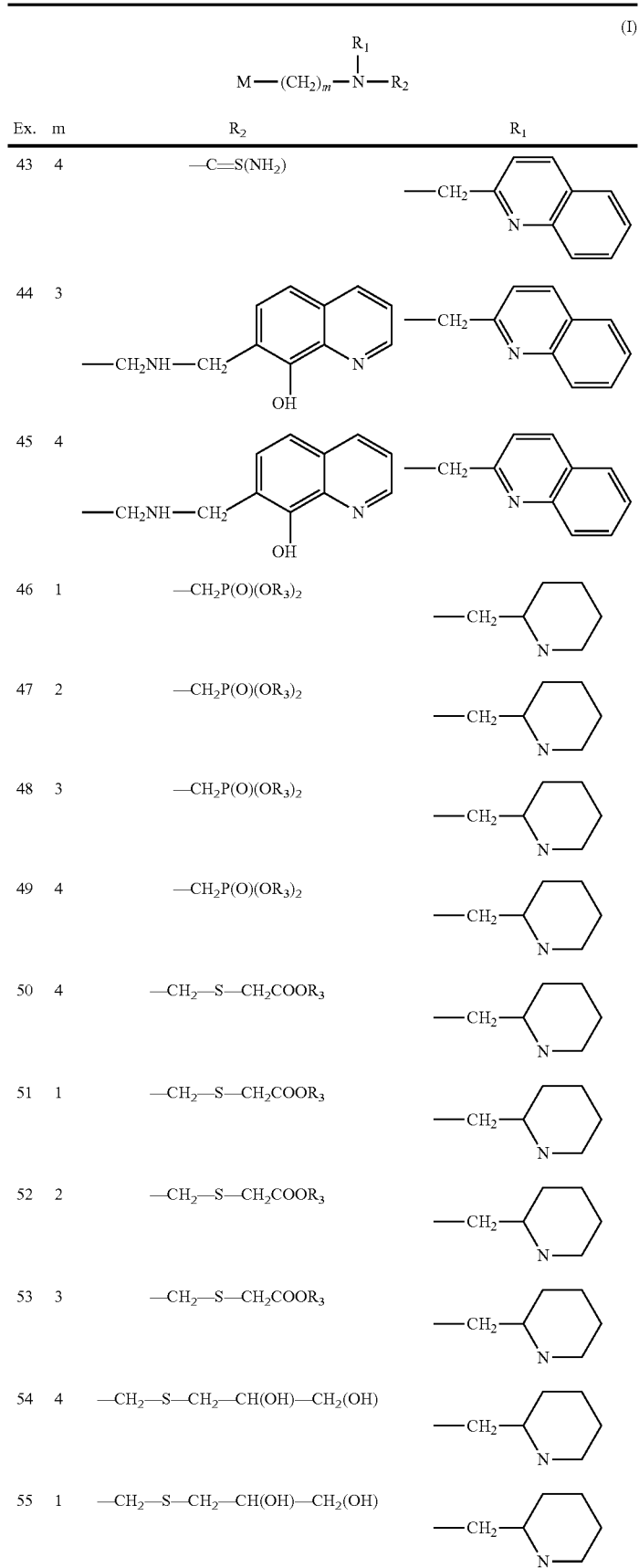

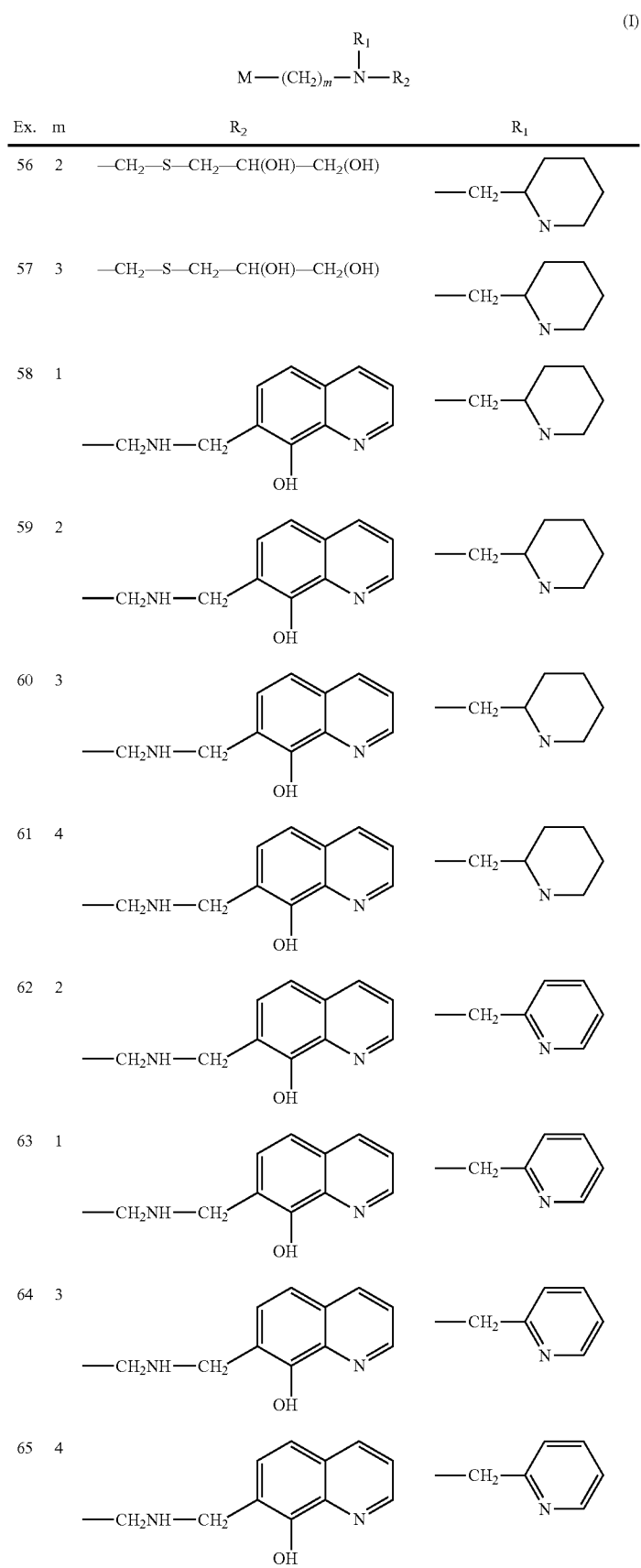

-continued $$M-(CH_2)_m-\underset{\underset{R_2}{|}}{\overset{\overset{R_1}{|}}{N}} \qquad (I)$$

| Ex. | m | R$_2$ | R$_1$ |
|---|---|---|---|
| 66 | 1 | —CH$_2$—S—CH$_2$—CH(OH)—CH$_2$(OH) | —CH$_2$-(2-pyridyl) |
| 67 | 2 | —CH$_2$—S—CH$_2$—CH(OH)—CH$_2$(OH) | —CH$_2$-(2-pyridyl) |
| 68 | 3 | —CH$_2$—S—CH$_2$—CH(OH)—CH$_2$(OH) | —CH$_2$-(2-pyridyl) |
| 69 | 4 | —CH$_2$—S—CH$_2$—CH(OH)—CH$_2$(OH) | —CH$_2$-(2-pyridyl) |
| 70 | 1 | —CH$_2$—S—CH$_2$COOR$_3$ | —CH$_2$-(2-pyridyl) |
| 71 | 2 | —CH$_2$—S—CH$_2$COOR$_3$ | —CH$_2$-(2-pyridyl) |
| 72 | 3 | —CH$_2$—S—CH$_2$COOR$_3$ | —CH$_2$-(2-pyridyl) |
| 73 | 4 | —CH$_2$—S—CH$_2$COOR$_3$ | —CH$_2$-(2-pyridyl) |
| 74 | 2 | —CH$_2$P(O)(OR$_3$)$_2$ | —CH$_2$-(2-pyridyl) |
| 75 | 3 | —CH$_2$P(O)(OR$_3$)$_2$ | —CH$_2$-(2-pyridyl) |
| 76 | 1 | —CH$_2$P(O)(OR$_3$)$_2$ | —CH$_2$-(2-pyridyl) |
| 77 | 4 | —CH$_2$P(O)(OR$_3$)$_2$ | —CH$_2$-(2-pyridyl) |
| 78 | 3 | —C=S(NH$_2$) | —CH$_2$-(2-pyridyl) |
| 79 | 4 | —C=S(NH$_2$) | —CH$_2$-(2-pyridyl) |

-continued $$M-(CH_2)_m-\underset{\underset{R_2}{|}}{\overset{\overset{R_1}{|}}{N}} \quad (I)$$

| Ex. | m | R$_2$ | R$_1$ |
|---|---|---|---|
| 80 | 1 | —C=S(NH$_2$) | —CH$_2$—(pyridin-2-yl) |
| 81 | 1 | —C=S(NH$_2$) | —CH$_2$—(pyridin-2-yl) |
| 82 | 1 | —CH$_2$—S—C$_1$-C$_4$-alkyl | —CH$_2$—(pyridin-2-yl) |
| 83 | 2 | —CH$_2$—S—C$_1$-C$_4$-alkyl | —CH$_2$—(pyridin-2-yl) |
| 84 | 3 | —CH$_2$—S—C$_1$-C$_4$-alkyl | —CH$_2$—(pyridin-2-yl) |
| 85 | 4 | —CH$_2$—S—C$_1$-C$_4$-alkyl | —CH$_2$—(pyridin-2-yl) |

What is claimed is:

1. A picolylamine resin, comprising:
    the copolymerization product of at least one monovinylaromatic compound and
    at least one polyvinylaromatic compound,
    wherein said picolylamine resin comprises, as functional groups, tertiary nitrogen atoms in structures according to the general formula (I)

$$M-(CH_2)_m-\underset{\underset{[R_2]_p}{|}}{\overset{\overset{[R_1]_n}{|}}{N}} \quad (I)$$

where
    R$_1$ is an optionally substituted picolyl,
    R$_2$ is —CH$_2$P(O)(OR$_3$)$_2$
    R$_3$ is a radical from the group consisting of H, Na and K,
    m is an integer from 1 to 4,
    n and p are each, independently of one another, a number in the range from 0.1 to 1.9 and the sum of n and p is 2, and
    M is the polymer matrix.

2. The picolylamine resin according to claim 1, wherein the resin has a macroporous structure.

3. The picolylamine resin according to claim 1, wherein the monovinylaromatic compound is styrene and the polyvinylaromatic compound is divinylbenzene.

4. The picolylamine resin according to claim 1, wherein n is a number from 0.5 to 1.5 and p is a number from 1.5 to 0.5 and the sum of n plus p is 2.

5. The picolylamine resin according to claim 1, wherein said picolylamine resin has a monodisperse particle size distribution.

6. A process for the adsorption of a metal from an aqueous solution, an organic liquid and/or a gas, comprising:
    contacting the aqueous solution, organic liquid and/or gas containing said metal with the picolylamine resin according to claim 1.

7. The process according to claim 6, wherein the metal is selected from the group consisting of mercury, iron, cobalt, nickel, copper, zinc, lead, cadmium, manganese, uranium, vanadium, elements of the platinum group, gold, and silver.

8. A process for the adsorption of copper from a sulphate solution or a copper/nickel sulphate solution containing said copper, comprising: contacting the sulphate solution or the copper/nickel sulphate solution with the picolylamine resin according to claim 1.

9. A process for preparing the picolylamine resin according to claim 1, comprising:
    a) reacting monomer droplets of a mixture of a monovinylaromatic compound, a polyvinylaromatic compound, an initiator or an initiator combination, thereby, forming a crosslinked bead polymer,
    b) functionalizing the crosslinked bead polymer with primary amino groups, thereby, forming a first functionalized bead polymer,
    c) reacting the first functionalized bead polymer with halomethyl nitrogen heterocycles to, thereby, form second functionalized bead polymers, said second functionalized bead polymers comprising basic anion-exchanging groups and methyl nitrogen heterocycles, and
    d) reacting said second functionalized bead polymer with phosphorus-hydrogen-acidic compounds to, thereby, form the picolylamine resin.

10. The picolylamine resin according to claim 1, wherein the resin has a gel-type structure.

11. The picolylamine resin according to claim 1, wherein the copolymerization product further comprises the product of at least one (meth)acrylic compound.

12. The process according to claim 9, wherein the mixture of step a) further comprises monomer droplets of a (meth)acrylic compound.

\* \* \* \* \*